US008433118B2

(12) United States Patent
Higuchi (10) Patent No.: US 8,433,118 B2
(45) Date of Patent: Apr. 30, 2013

(54) MEDICAL IMAGE-PROCESSING APPARATUS AND METHOD, AND MAGNETIC RESONANCE IMAGING APPARATUS

(75) Inventor: Kazuo Higuchi, Nasushiobara (JP)

(73) Assignees: Kabushiki Kaisha Toshiba, Minato-Ku, Tokyo (JP); Toshiba Medical Systems Corporation, Otawara-Shi, Tochigi (JP)

(*) Notice: Subject to any disclaimer, the term of this patent is extended or adjusted under 35 U.S.C. 154(b) by 846 days.

(21) Appl. No.: 11/727,060

(22) Filed: Mar. 23, 2007

(65) Prior Publication Data

US 2007/0229492 A1    Oct. 4, 2007

(30) Foreign Application Priority Data

Mar. 31, 2006    (JP) ................. 2006-100223

(51) Int. Cl.
*G06K 9/00*    (2006.01)
(52) U.S. Cl.
USPC ........................................... 382/131
(58) Field of Classification Search .......... 382/128, 382/131, 294; 378/20
See application file for complete search history.

(56) References Cited

U.S. PATENT DOCUMENTS

| | | | | |
|---|---|---|---|---|
| 5,954,650 A * | 9/1999 | Saito et al. | ................. | 600/425 |
| 6,970,585 B1 * | 11/2005 | Dafni et al. | ................. | 382/131 |
| 7,450,781 B2 * | 11/2008 | Barth et al. | ................. | 382/284 |
| 7,650,044 B2 * | 1/2010 | Kreang-Arekul et al. | ..... | 382/274 |
| 2004/0114717 A1 * | 6/2004 | Kato | ................. | 378/62 |
| 2005/0041041 A1 * | 2/2005 | Sakai | ................. | 345/629 |
| 2005/0135707 A1 * | 6/2005 | Turek et al. | ................. | 382/294 |
| 2006/0074285 A1 * | 4/2006 | Zarkh et al. | ................. | 600/407 |
| 2006/0120583 A1 * | 6/2006 | Dewaele | ................. | 382/128 |
| 2006/0135865 A1 * | 6/2006 | Bharara et al. | ................. | 600/407 |
| 2008/0045827 A1 * | 2/2008 | Rongen et al. | ................. | 600/407 |
| 2009/0080748 A1 * | 3/2009 | Reeves et al. | ................. | 382/131 |

FOREIGN PATENT DOCUMENTS

| | | |
|---|---|---|
| JP | 2000-268178 | 9/2000 |
| JP | 2006-14931 | 1/2006 |
| JP | 2007-151965 | 6/2007 |
| WO | 2006/028015 A1 | 3/2006 |

OTHER PUBLICATIONS

Office Action mailed on May 22, 2012 in JP 2007-077121 with English translation.

* cited by examiner

*Primary Examiner* — Claire X Wang
*Assistant Examiner* — Shervin Nakhjavan
(74) *Attorney, Agent, or Firm* — Nixon & Vanderhye PC (57) ABSTRACT

A medical image-processing apparatus includes a display unit configured to display a plurality of medical images obtained at different imaging positions, a setting unit configured to set a point of interest on each of the medical images in accordance with an operation of an operator, an alignment unit configured to align the medical images on the display unit, with the points of interest on the medical images made to coincide with each other, and a post-processing unit configured to perform post processing concerning the medical images aligned by the alignment unit.

10 Claims, 5 Drawing Sheets

MEDICAL IMAGE-PROCESSING APPARATUS AND METHOD, AND MAGNETIC RESONANCE IMAGING APPARATUS

CROSS-REFERENCE TO RELATED APPLICATIONS

This application is based upon and claims the benefit of priority from prior Japanese Patent Application No. 2006-100223, filed Mar. 31, 2006, the entire contents of which are incorporated herein by reference.

BACKGROUND OF THE INVENTION

1. Field of the Invention

The present invention relates to a medical image-processing apparatus and method for simultaneously displaying, on the screen of a built-in or external display, a plurality of medical images obtained at different imaging positions, and a magnetic resonance imaging apparatus for picking up an image of a subject utilizing a magnetic resonance signal emitted from the subject.

2. Description of the Related Art

In recent years, a method (hereinafter referred to as "wide-range imaging") has come to be utilized, in which a wide area that cannot be imaged at one-time imaging is imaged by performing a plurality of imaging operations while moving a bed during the intervals of the imaging operations.

In this case, a plurality of images obtained by the imaging operations are stitched together to form a single image corresponding to the wide area. When the images are manually positioned and stitched, panning (change of display ranges) and zooming (change of display magnifications) are performed appropriately on images to enable them to be stitched appropriately.

In general, a zooming operation is performed after a panning operation. However, zooming processing corresponding to the zooming operation is executed on an image with the center of the image used as a fulcrum, and hence the portions stitched by the panning operation may well be displaced from each other. For this reason, operators often must perform a complex operation in which panning and zooming are repeated to gradually make the stitched image approximate a desired one.

Jpn. Pat. Appln. KOKAI Publication No. 2000-268178 discloses a technique of positioning two images.

BRIEF SUMMARY OF THE INVENTION

Under the above circumstances, there is a demand for facilitating a manual operation for stitching images.

According to a first aspect of the present invention, there is provided a medical image-processing apparatus comprising: a display unit configured to display a plurality of medical images obtained at different imaging positions; a setting unit configured to set a point of interest on each of the medical images in accordance with an operation of an operator; an alignment unit configured to align the medical images on the display unit, with the points of interest on the medical images made to coincide with each other; and a post-processing unit configured to perform post processing concerning the medical images aligned by the alignment unit.

According to a second aspect of the present invention, there is provided a magnetic resonance imaging apparatus comprising: an imaging unit configured to image a subject utilizing a magnetic resonance signal emitted from the subject; a display unit configured to display a plurality of medical images imaged by the imaging unit with a position of imaging varied; a setting unit configured to set a point of interest on each of the medical images in accordance with an operation of an operator; an alignment unit configured to align the medical images on the display unit, with the points of interest on the medical images made to coincide with each other; and a post-processing unit configured to perform post processing concerning the medical images aligned by the alignment unit.

According to a third aspect of the present invention, there is provided a medical image-processing method comprising: displaying, on a display unit, a plurality of medical images obtained at different imaging positions; setting a point of interest on each of the medical images in accordance with an operation of an operator; aligning the medical images on the display unit, with the points of interest on the medical images made to coincide with each other; and performing post processing concerning the medical images aligned.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the invention will be described with reference to the accompanying drawings.

Figure 1:
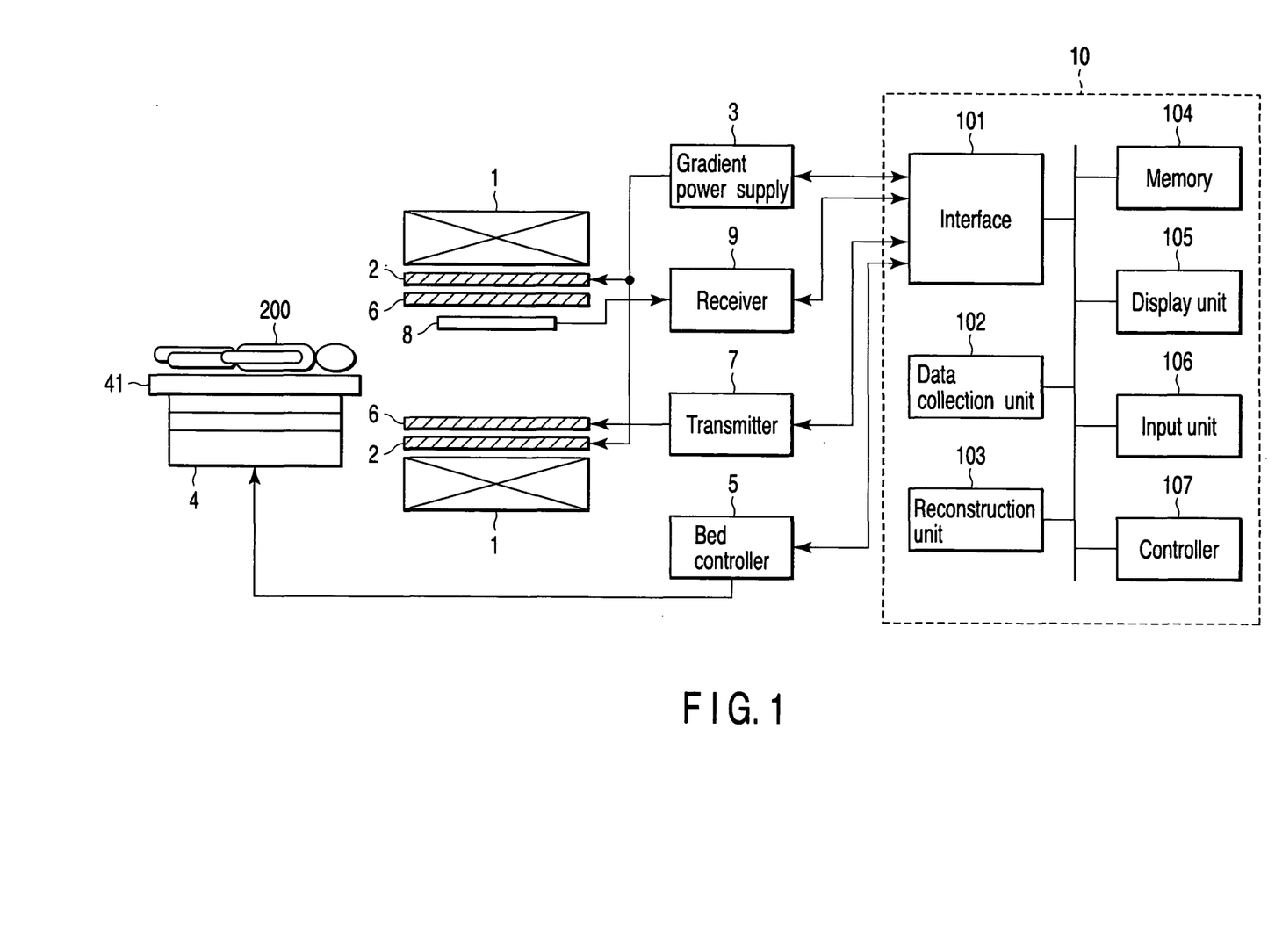
FIG. 1 is a block diagram illustrating the configuration of a magnetic resonance imaging apparatus (MRI apparatus) according to an embodiment of the invention.

FIG. 1 is a block diagram illustrating the configuration of a magnetic resonance imaging apparatus (MRI apparatus) according to the embodiment. The MRI apparatus of FIG. 1 comprises a static field magnet 1, gradient coil 2, gradient power supply 3, bed 4, bed controller 5, transmission RF coil 6, transmitter 7, reception RF coil 8, receiver 9 and computer system 10.

The static field magnet 1 is a hollow cylindrical member, and generates a uniform static field. The static field magnet 1 is, for example, a permanent magnet or superconducting magnet.

The gradient coil 2 is also a hollow cylindrical member located inside the static field magnet 1. The gradient coil 2 is formed of three coils corresponding to three axes X, Y and Z perpendicular to each other. In the gradient coil 2, the three coils are individually supplied with a current from a gradient power supply 3, thereby generating gradient magnetic fields having their magnetic field intensities varied along the X, Y and Z axes. Assume here that the Z-axis direction corresponds to, for example, the magnetization direction of the static field. The gradient magnetic fields along the X, Y and Z axes correspond to, for example, a slice-selecting gradient magnetic field Gs, phase-encoding gradient magnetic field Ge and readout gradient magnetic field Gr, respectively. The slice-selecting gradient magnetic field Gs is used to determine an arbitrary imaging section. The phase-encoding gradient magnetic field Ge is used to change the phase of a magnetic resonance signal in accordance with its spatial position. The readout gradient magnetic field Gr is used to change the frequency of a magnetic resonance signal in accordance with its spatial position.

A subject 200 placed on the top board 41 of the bed 4 is inserted into the cavity (imaging space) of the gradient coil 2 along with the bed 4. The top board 41 of the bed 4 is longitudinally and vertically driven by the bed controller 5. Normally, the bed 4 is positioned with its longitudinal direction set parallel to the axis of the static field magnet 1.

The transmission RF coil 6 is located inside the gradient coil 2, and is used to generate a high-frequency magnetic field upon receiving a high-frequency pulse signal from the transmitter 7.

The transmitter 7 transmits, to the transmission RF coil 6, a high-frequency pulse signal corresponding to the Larmor frequency.

The reception RF coil 8 is located inside the gradient coil 2. The reception RF coil 8 receives a magnetic resonance signal emitted from a subject positioned in the high-frequency magnetic field, and outputs a signal to the receiver 9.

The receiver 9 generates magnetic resonance signal data based on the signal output from the reception RF coil 8.

The computer system 10 includes an interface 101, data collection unit 102, reconstruction unit 103, memory 104, display unit 105, input unit 106 and controller 107.

The interface 101 is connected to the gradient power supply 3, bed controller 5, transmitter 7, reception RF coil 8, receiver 9, etc. The interface 101 receives and transmits signals from and to the components connected thereto.

The data collection unit 102 collects, via the interface 101, a digital signal (i.e., magnetic resonance signal data) output from the receiver 9, and stores it in the memory 104.

The reconstruction unit 103 performs post-processing, i.e., reconstruction processing such as Fourier transform, on the magnetic resonance signal data stored in the memory 104, thereby acquiring spectrum data or image data corresponding to a desired nuclear spin in the subject 200.

The memory 104 stores the magnetic resonance signal data and spectrum data or image data of each patient (subject).

The display unit 105 displays various information items, such as spectrum data, image data, etc., under the control of the controller 107. The display unit 105 may be formed of, for example, a liquid crystal display.

The input unit 106 receives various instructions or information items input by an operator. The input unit 106 may be a pointing device such as a mouse or track ball, a selective device such as a mode switch, or an input device such as a keyboard.

The controller 107 includes a CPU, memory, etc., not shown, and controls the entire MRI apparatus of the embodiment. The controller 107 has the following functions, as well as the control functions for realizing the known functions incorporated in the MRI apparatus. Namely, it has a function of simultaneously displaying, on the display screen of the display unit 105, two images obtained by imaging performed while changing the imaging position. It also has a function of setting a point of interest on each of the two images in accordance with the operation of the operator. It has a function of displaying, on the display unit 105, two images arranged so that the points of interest on the two images coincide with each other. It further has a function of generating a single image obtained by stitching two images, displayed on the display unit 105.

The operation of the MRI apparatus constructed as above will be described.

The operation of imaging the subject 200 is similar to that performed by conventional MRI apparatuses, and is therefore not described in detail. A detailed description will now be given of the operation of stitching together, to form a single image, two parent images obtained by performing imaging twice while changing the imaging position.

Figure 2:
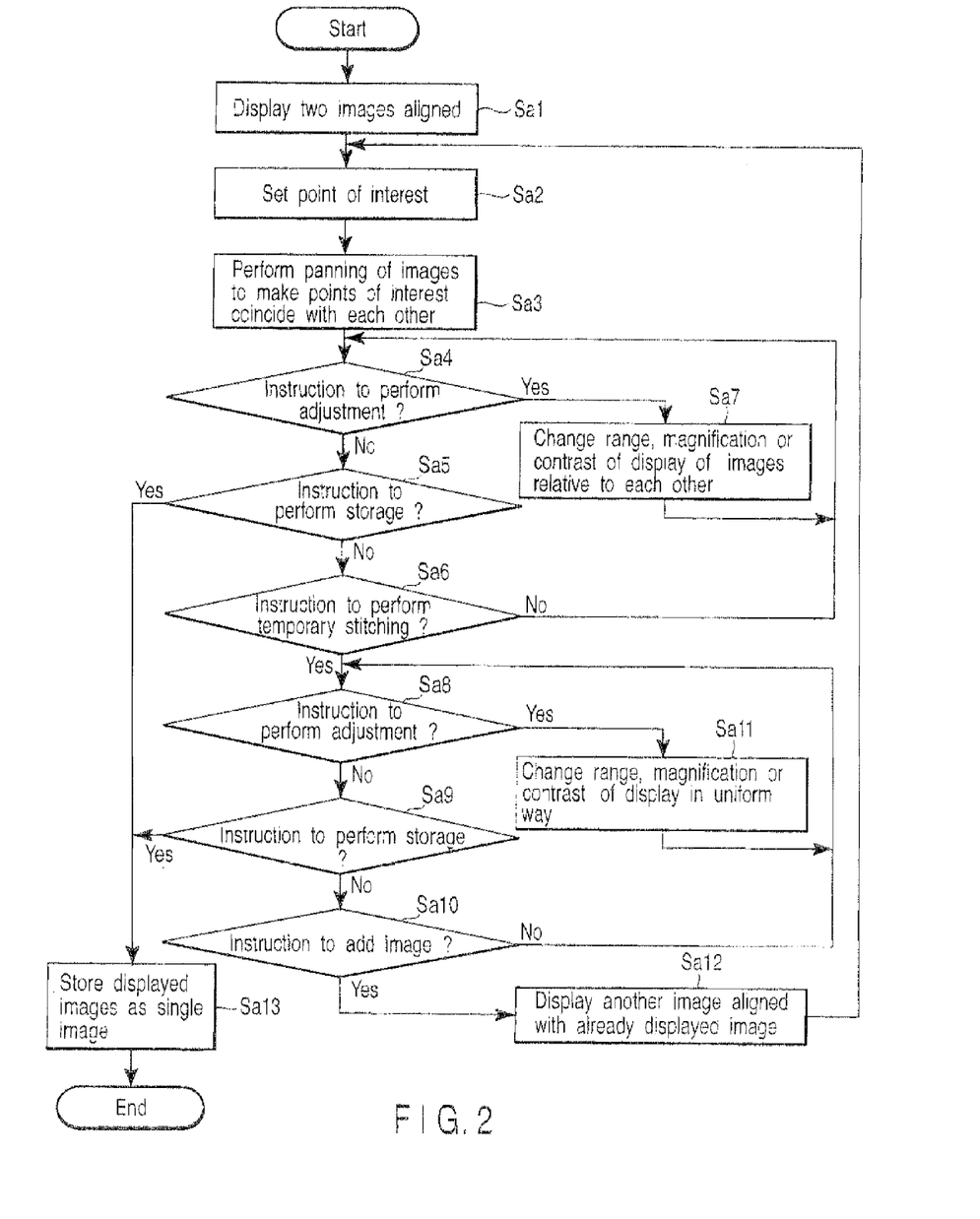
FIG. 2 is a flowchart illustrating a procedure of stitching two parent images together to form a single image, performed by the controller appearing in FIG. 1.

FIG. 2 is a flowchart illustrating a procedure of stitching two parent images together to form a single image, performed by the controller 107.

At step Sa1, the controller 107 causes the display unit 105 to display first and second parent images aligned, which have been designated by the operator as targets to be stitched. Portions of the parent images outside a display region are controlled not to be displayed on the display unit 105. Further, if the parent images overlap each other, the overlapping portion is not displayed on the display unit 105.

Figure 3:
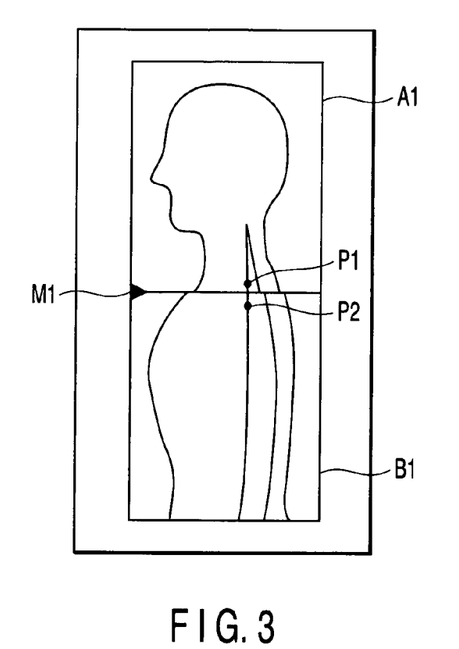
FIG. 3 is a view illustrating a display image example on the display unit appearing in FIG. 1, obtained after points of interest are set.

At step Sa2, the controller 107 sets respective points of interest on the parent images in accordance with the operation of the operator. FIG. 3 is a view illustrating a display image example on the display unit 105, obtained after points of interest are set. Specifically, FIG. 3 shows image A1 as part of a first parent image, and image B1 as part of a second parent image. Point P1 of interest is set in the first parent image, and point P2 of interest is set in the second parent image. The controller 107 may display, on the display unit 105, mark M1 indicating the boundary of the parent images, as shown in FIG. 3.

Figure 4:
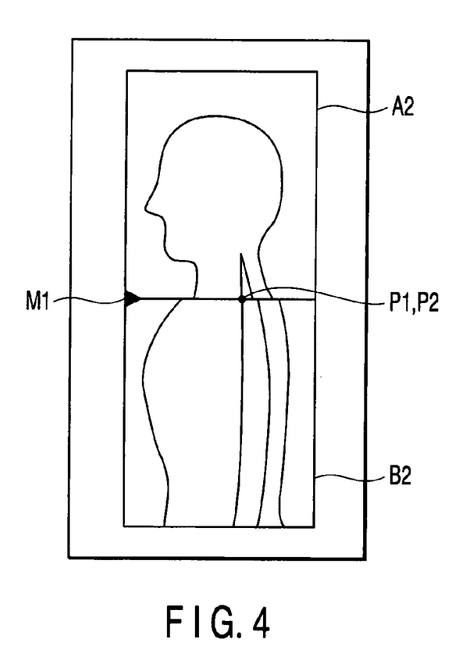
FIG. 4 is a view illustrating a display image example on the display unit appearing in FIG. 1, obtained after the points of interest shown in FIG. 3 are made to coincide with each other.

At step Sa3, the controller 107 pans the parent images so as to make the set two points of interest coincide with each other. At this time, the controller 107 may change the display contrast degrees of one of the two parent images relative to the other, so that the two points of interest have the same image value. When adjusting the display contrast, the two parent images can be set to the same average display contrast, or the overlapping areas of the two parent images can be set to the same average display contrast. FIG. 4 shows a display example on the display unit 105 obtained after the two points P1 and P2 of interest are made to coincide with each other. The coinciding two points P1 and P2 are obtained by panning the first and second parent images to change images A1 and B1 to images A2 and B2, respectively.

At steps Sa4 to Sa6, the controller 107 is ready to receive an adjustment instruction, storage instruction or temporary stitching instruction. This state will hereinafter be referred to as "the first standby state."

The operator confirms the image in which the points of interest coincide with each other, and performs, through the input unit 106 when necessary, an operation for instructing adjustment of the range, magnification or contrast of display. After issuing such an adjustment instruction, the controller 107 proceeds from step Sa4 to step Sa7.

At step Sa7, the controller 107 changes the range, magnification or contrast of display in accordance with the operation of the operator.

At this time, if adjustment of the display range is instructed, the controller 107 pans the first and second parent images. In principle, the points of interest must be set on a common point of the first and second parent images. However, they may deviate from each other because of inaccurate mouse operation. In this case, the stitched state of the first and second parent images can be adjusted by adjusting the range of display. When the display range is adjusted, the points of interest on the first and second parent images deviate from each other on the display. To compensate for it, the controller 107 updates the point of interest on one of the first and second parent images so that it coincides with the point of interest on the other parent image. Alternatively, both the points of interest on the first and second parent images may be updated by, for example, moving them to the intermediate point therebetween.

Upon receiving an instruction to adjust the magnification of display, the controller 107 expands/reduces at least one of the first and second parent images to change the display magnifications of the first and second parent images relative to each other. At this time, the point of interest on the parent image whose magnification of display is changed is used as a reference point for expansion/reduction to maintain the points of interest on the parent images to coincide with each other.

Figure 5:
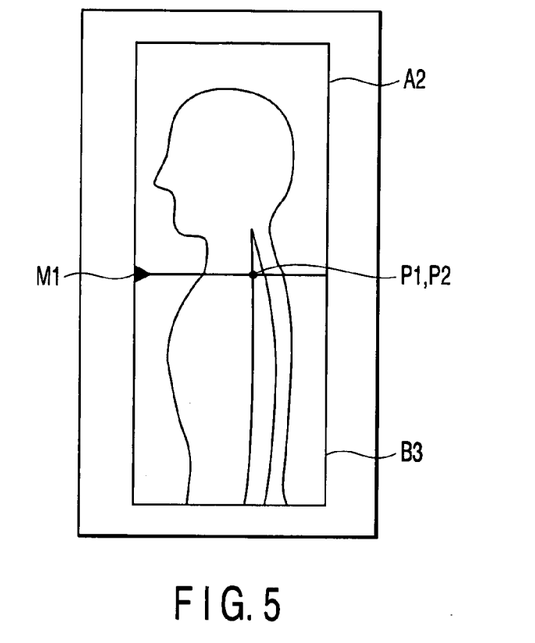
FIG. 5 is a view illustrating a display image example on the display unit appearing in FIG. 1, obtained after the display magnifications of the parent image shown in FIG. 4 are changed.

In general, only the parent image designated by the operator is subjected to change of the range, magnification or contrast of display. However, the ranges, magnifications and densities of the first and second parent images may be changed under different conditions. For instance, when a certain contrast level has been designated, the contrast levels of the first and second parent images are individually changed to set the average contrast levels of the first and second parent images to the designated level. FIG. 5 is a view illustrating a display image example on the display unit 105, obtained after the display magnification of the second parent image of FIG. 4 is changed. In the display example of FIG. 5, since the display magnification of the second parent image is reduced only in the lateral direction, the image extracted from the second parent image and displayed on the screen is changed from image B2 to image B3. After setting the first and second parent images to desired to-be-stitched states, the operator performs an operation for instructing storage of the images or temporary stitching of the images, using the input unit 106. Upon receiving the instruction to perform temporary stitching, the controller 107 proceeds from step Sa6 to step Sa8 to Sa10, where it assumes a standby state. This state will hereinafter be referred to "the second standby state."

In the second standby state, the controller 107 is ready to receive an adjustment instruction, storage instruction or image addition instruction.

The operator confirms the image currently displayed, and performs, through the input unit 106 when necessary, an operation for instructing adjustment of the range, magnification, contrast or position of display. After issuing such an adjustment instruction, the controller 107 proceeds from step Sa8 to step Sa11.

Figure 6:
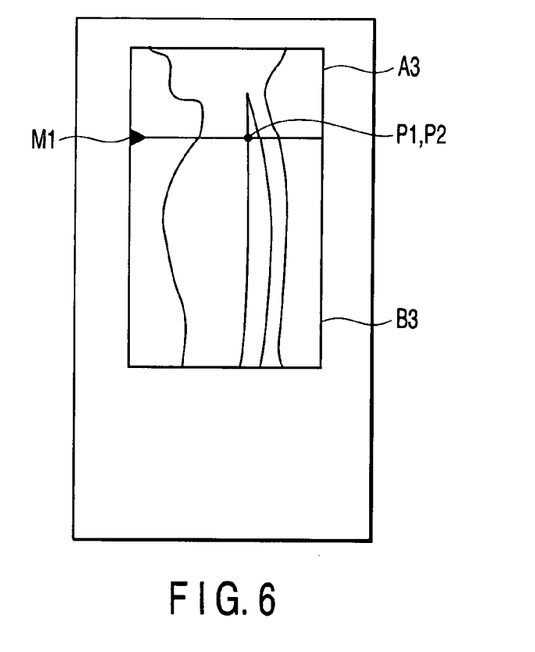
FIG. 6 is a view illustrating a display image example on the display unit appearing in FIG. 1, obtained after the display position is shifted from that shown in FIG. 5.

At step Sa11, the controller 107 changes the range, magnification, contrast or position of display in accordance with the operation of the operator, with the positional relationship between the first and second parent images maintained. At this time, the controller 107 keeps the points of interest on the first and second parent images in coincidence with each other. FIG. 6 is a view illustrating a display image example on the display unit 105, obtained after the display positions of the parent images are shifted from those shown in FIG. 5. In FIG. 6, the display positions are upwardly shifted from that shown in FIG. 5. Namely, the first and second parent images are upwardly shifted by the same distance. As a result of this, the display range of the first parent image is narrowed, i.e., the display range is changed from image A2 to image A3 in FIG. 6. After performing the operation for changing as the operator instructs, the controller 107 returns to the second standby state.

If the operator wants to stitch yet another parent image to the image currently displayed, the operator performs an operation for instructing addition of an image, using the input unit 106. Upon receiving such an image addition instruction, the controller 107 proceeds from step Sa10 to step Sa12.

At step Sa12, the controller 107 displays, on the display unit 105, the image designated as a target to be newly stitched to the images currently displayed. After that, the controller 107 repeats steps Sa2 and the later steps. At this time, the controller 107 treats, as a single parent image, the images already displayed when an image addition instruction is issued, and treats, as another parent image, the image additionally displayed at step Sa12.

When the operator can regard, as a desired image, the image currently displayed on the display unit 105, the operator performs an operation for storing it, using the input unit 106. Upon receiving an instruction to store the image, the controller 107 proceeds from step Sa5 or Sa9 to step Sa13.

At step Sa13, the controller 107 stores, as a single image into the memory 104, the image currently display on the display unit 105. The image to be stored may contain mark M1 or may not contain the same.

As described above, the display ranges of the first and second parent images are automatically changed so that the points of interest set on the parent images are made to coincide with each other. Accordingly, if points of interest are set on the portions included in common in the first and second parent images, which portions the operator wants to stitch, the first and second parent images are displayed so that the portions are displayed at the same position, i.e., the first and second parent images are displayed in a stitched state the operator intends to see. Namely, it is not necessary for the operator to perform complex panning operations.

Further, in the embodiment, even after two points of interest are made to coincide with each other, the display ranges of the first and second parent images can be manually changed relative to each other. If the two points of interest are displaced from each other when the display ranges are changed relative to each other, they are updated to compensate for the displacements. Thus, when the first and second parent images are unintentionally displaced from each other because of a displacement in point-of-interest setting, the displacement can be eliminated by adjustment. Furthermore, since the points of interest are automatically updated so that they coincide with each other, such a displacement in point-of-interest setting can also be automatically compensated for. This enables more accurate stitching of parent images and reduction of time and effort of the operator who sets points of interest.

Also, since in the embodiment, the two points of interest can be maintained to coincide with each other even when the display magnifications of the first and second parent images are changed relative to each other, the initially intended positional relationship between the first and second parent images can be maintained. As a result, the time and effort of the operation can be significantly reduced, compared to the case where the positional relationship must be re-adjusted by performing panning again.

In the embodiment, change of the range, magnification, contrast or position of display after an instruction to temporarily stitch parent images is issued is performed in a single uniform way with the positional relationship between the first and second parent images maintained. Therefore, the operator can regard the first and second parent images as a single image, and can adjust them with less time and effort than in the case where the two parent images are individually adjusted.

In the embodiment, when the $3^{rd}$ or subsequent parent image is further stitched, it is sufficient if the above-described operation of stitching two parent images is repeated, since the already temporarily stitched images are treated as a single parent image. This process can reduce the time and effort of the operator, compared to the case where three parent images are simultaneously aligned and processed on the screen.

Yet further, in the embodiment, mark M1 displayed on the screen enables the operator to easily recognize the boundary of the first and second parent images.

Figure 7:
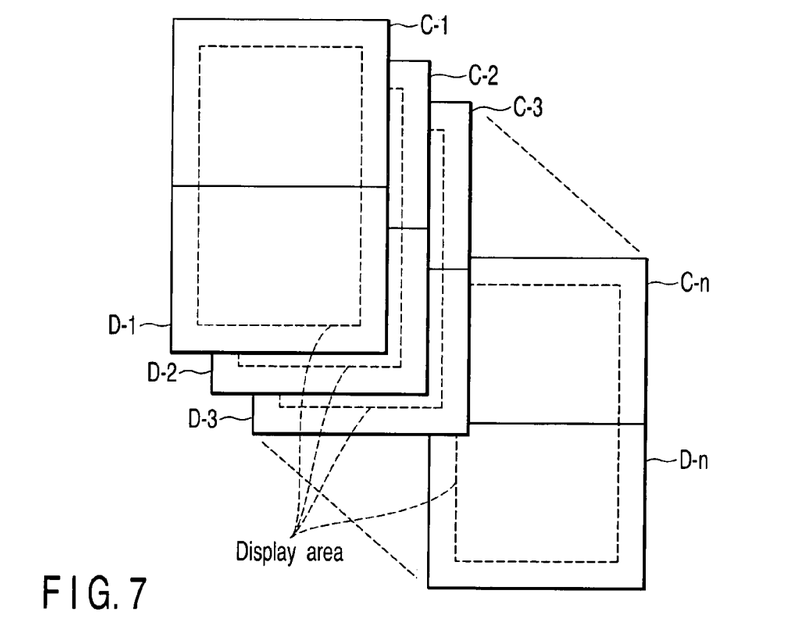
FIG. 7 is a view illustrating a positional relationship example between combinations of parent images obtained at different slicing positions for three-dimensional or multi-slicing imaging.
Figure 8:
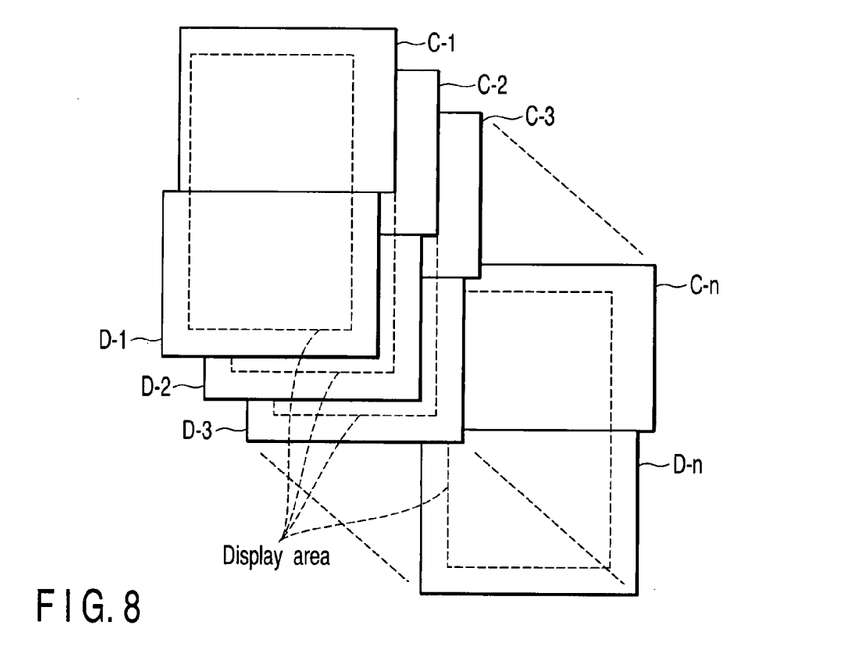
FIG. 8 is a view useful in explaining a state in which the positional relationships between the parent images included in all combinations are changed in accordance with an instruction to change the positional relationship between the parent images included in a certain combination.

The embodiment can be modified in various ways, some of which are described as follows:

When there are a plurality of combinations of parent images obtained at a plurality of slicing positions for three-dimensional imaging or multi-slicing imaging, the result of the above-described process performed on a plurality of parent images obtained at a certain slicing position may be used in common for a plurality of combinations of parent images obtained at the other slicing positions. For instance, assume that parent images C-1, C-2, C-3, . . . , C-n and D-1, D-2, D-3, . . . , D-n obtained at n slicing positions exist as images of the positional relationship shown in FIG. 7. In this state, if an instruction to perform leftward panning of parent image C-1 is issued, all parent images C-1, . . . , C-n are subjected to similar leftward panning as shown in FIG. 8. This process makes it unnecessary for the operator to repeat a similar operation on combinations of parent images obtained at different slicing positions, with the result that the time and effort of the operator can be reduced.

Three or more parent images may be stitched by one operation.

A medical image-processing apparatus can be realized which does not have an imaging function but only has a function of processing, using the procedure of FIG. 2, parent images output from, for example, an MRI apparatus.

An external display unit may perform image display described as above.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A medical image-processing apparatus comprising:
 a display unit configured to display a plurality of medical images of an object obtained at different imaging positions;
 at least one central processing unit (CPU) configured to:
 (a) set a common point of interest on each of the medical images in accordance with an operation of an operator;
 (b) align the medical images on the display unit, with the points of interest on the medical images made to coincide with each other, wherein said alignment comprises panning at least one of the medical images with respect to another of the medical images; and
 (c) change a display magnification of one of the medical images and automatically to detect any deviation or displacement and to compensate for the deviation or displacement of the points of interest on at least one other medical image by updating the points of interest on the medical images as necessary to keep the points of interest of the other medical image and the magnified image in coincidence with each other on said displayed mages.

2. The medical image-processing apparatus according to claim 1, wherein when display ranges of the medical images are changed relative to each other after the points of interest are made to coincide with each other, the at least one CPU updates the points of interest on the medical images relative to each other to compensate for a displacement between the points of interest which occurs in accordance with changes in the display ranges.

3. The medical image-processing apparatus according to claim 1, wherein the at least one CPU changes display densities of the medical images relative to each other.

4. The medical image-processing apparatus according to claim 3, wherein the at least one CPU changes the display densities of the medical images relative to each other to make equal image values, on the display unit, at least one of (a) the points of interest on the medical images, (b) an average display contrast of the medical images, or (c) an average display contrast of overlapping areas included in the medical images.

5. The medical image-processing apparatus according to claim 3, wherein the at least one CPU changes the display densities of the medical images in accordance with an operation of the operator.

6. The medical image-processing apparatus according to claim 1, wherein said at least one CPU is further configured to generate a single medical image by stitching the medical images on the display unit.

7. The medical image-processing apparatus according to claim 1, wherein said at least one CPU is further configured to add, to the medical images on the display unit, a mark indicating a boundary of the aligned medical images.

8. The medical image-processing apparatus according to claim 1, wherein when there is a first combination of multi-slice medical images from different planes, the at least one CPU is configured to align the medical images of the first combination with a same positional relationship as a positional relationship of medical images of another combination of multi-slice medical images.

9. A magnetic resonance imaging apparatus comprising:
 an imaging unit configured to image a subject utilizing a magnetic resonance signal emitted from the subject;

a display unit configured to display a plurality of medical images of the subject imaged by the imaging unit with a position of imaging varied;

at least one central processing unit (CPU) configured to:

(a) set a common point of interest on each of the medical images in accordance with an operation of an operator;

(b) align the medical images on the display unit, with the points of interest on the medical images made to coincide with each other, wherein said alignment comprises panning at least one of the medical images with respect to another of the medical images; and (c) change a display magnification of one of the medical images and automatically detect any deviation or displacement and to compensate for the deviation or displacement of the points of interest on at least one other medical image by updating the points of interest on the medical images so as to keep the points of interest of the other medical image and the magnified image in coincidence with each other.

10. A medical image-processing method comprising:
configuring and using at least one programmed central processor (CPU) to (a) display a plurality of medical images of an object obtained at different imaging positions;

(b) set a common point of interest on each of the medical images in accordance with an operation of an operator;

(c) align the medical images on the display unit, with the points of interest on the medical images made to coincide with each other, wherein said alignment comprises panning at least one of the medical images with respect to another of the medical images; and (d) change a display magnification of one of the medical images and automatically to detect any deviation or displacement and to compensate for the deviation or displacement of the points of interest on at least one other medical image by updating the points of interest on the medical images as necessary to keep the points of interest of the other medical image and the magnified image in coincidence with each other on said plurality of displayed medical images.

* * * * *